United States Patent [19]

Fiebrich et al.

[11] Patent Number: 5,504,689
[45] Date of Patent: Apr. 2, 1996

[54] APPARATUS AND METHOD FOR TESTING COMPUTER BUS CHARACTERISTICS

[75] Inventors: Gregory R. Fiebrich; James B. Mobley, both of Austin, Tex.

[73] Assignee: Dell USA, L.P., Austin, Tex.

[21] Appl. No.: 168,629

[22] Filed: Dec. 16, 1993

[51] Int. Cl.$^6$ ............................................. G01R 31/02
[52] U.S. Cl. ................................ 364/481; 395/183.19
[58] Field of Search ........................ 364/481; 395/250, 395/325, 575, 20.1, 183.19, 28; 371/8.2, 23, 28, 29.5; 324/613, 620, 539, 537; 333/124; 327/108

[56] References Cited

U.S. PATENT DOCUMENTS

| | | | |
|---|---|---|---|
| 4,847,838 | 7/1989 | Kralik | 371/29.5 |
| 4,858,231 | 8/1989 | Patterson | 333/124 |
| 5,218,307 | 6/1993 | Hiller | 324/539 |
| 5,313,595 | 5/1994 | Lewis et al. | 395/325 |
| 5,359,235 | 10/1994 | Coyle et al. | 327/108 |

*Primary Examiner*—Emanuel T. Voeltz
*Assistant Examiner*—Thomas Peeso
*Attorney, Agent, or Firm*—Henry Garrana; Michelle Turner

[57] ABSTRACT

Disclosed are an apparatus and method preferably for testing personal computer (PC) bus transmission line characteristics. The apparatus comprises: (1) a plurality of transmission line segments having different physical dimensions, each of the plurality of segments having a different electrical effect on signals transmitted thereon and (2) a switching circuit capable of coupling successive ones of the plurality of segments to an external conductor, an electrical characteristic of the external conductor affected by the coupling of the successive ones of the plurality of segments thereto, the apparatus permitting signals to pass through the external conductor and a selected one of the plurality of segments via the switching circuit. The apparatus allows a determination of a susceptibility of the external conductor to changes in transmission line electrical characteristics brought about by various possible combinations of peripheral expansion bus cards.

40 Claims, 3 Drawing Sheets

APPARATUS AND METHOD FOR TESTING COMPUTER BUS CHARACTERISTICS

TECHNICAL FIELD OF THE INVENTION

The present invention is directed, in general, to test apparatus in general purpose computers and, more specifically, to a test apparatus and method for analyzing the electrical characteristics of computer buses.

BACKGROUND OF THE INVENTION

Today's standard computer architecture calls for a number of separate components, such as a central processing unit ("CPU"), memory, ports and peripheral devices to be coupled together by electrical buses to provide a pathway for data between the various components. Electrical buses are simply groups of conductors (or lines) designed to operate as a group.

In typical computer architectures, there are address buses, data buses and control buses. Address buses are designed to transmit address data to allow selection of input/output ("I/O") devices and memory locations for data transfer. Data buses carry the substantive data to be transferred. Control buses transmit control signals to allow for synchronization and priority among the various components of the computer, enabling them to work in concert.

Components transmit data over buses by changing voltages on the various lines of the bus. In binary digital computers, each line in a bus is capable of assuming one of two possible states at a given moment. These states are represented by presence or absence of a voltage, or potential difference relative to ground, on each of the lines. In some schemes, the presence of a voltage denotes a binary zero and the absence of a voltage denotes a binary one. In other schemes, the presence of a voltage denotes a change from one state to the other, while the absence of a voltage denotes no change.

During operation of the computer, each particular line in the bus may change between binary one and binary zero many millions of times a second. Individual transitions in the signal thus should have relatively sharp rising and falling edges and be relatively brief in duration to preserve the integrity and fidelity of the data transmitted over the bus. Therefore, it is important that transitions between binary one and binary zero be fast and sure. In an ideal world, the bus changes voltages instantaneously and data is transmitted reliably. Unfortunately, in the real world, buses contain capacitance, resistance and inductance ("transmission line effects") just as do all real conductors.

Capacitance traps electrical charge within the conductor, presenting, in a sense, a momentum against which transitions must take place. When the line undergoes a voltage transition, capacitance in the line resists the change, typically causing a voltage oscillation at signal edges transition (termed "ringing"). This ringing may be of sufficient magnitude as to cause components reading data from the bus to misread the oscillation as being valid data, instead of a spurious transition, thereby corrupting the flow of data. To restore data integrity, data rates must be lowered.

Resistance dissipates electrical energy in the conductor, reducing the efficiency of the computer bus. Increased resistance may attenuate signals on the bus to the point that data are lost in transmission, compromising data integrity.

Inductance causes crosstalk between neighboring conductors (mutual inductance) or resistance to changes in voltage on a given conductor (self inductance). Thus, signal transitions may be delayed or made unsharp, further corrupting the data. Finally, capacitance, resistance and inductance can cooperate to cause harmonic resonance on conductors in an electrical bus, resulting in spurious frequencies being created, amplified or maintained.

During design of a new computer system, it is important to ensure that buses are not susceptible to signal distortion from stray capacitance, resistance or inductance. There are accepted design rules that can be applied to minimize these ill effects.

Today's personal computers ("PCs") employ, in general, an open architecture featuring a plurality of expansion slots that are provided within the main chassis thereof. Each of the slots has a connector adapted to receive a peripheral (also "adapter" or "expansion") daughterboard (or, interchangeably, "card") therein. The connector receives a card edge having a plurality of card edge contacts thereon. The contacts couple circuitry on the peripheral card to expansion address, data and control buses on the PC. A PC user is therefore able to equip the PC to perform desired functions.

For instance, there are peripheral cards containing modems; facsimiles; disk drives or controllers; video controllers; serial, parallel or small computer systems interface ("SCSI") ports; auxiliary memory; coprocessors; sound boards; recognition boards; network boards and the like. There are many manufacturers of these and other cards, resulting in literally thousands of different card combinations and permutations that are possible to install in a single computer. Since each installed card couples to the computer's expansion buses, the installation of a card to a system is likely to have an effect on the electrical characteristics (capacitance, resistance and inductance) of each of the conductors in the buses. The cards may electrically interact with each other in a nonobvious way to further compromise bus performance.

New chip sets for personal computers, using, in particular, 1.0 micron and smaller complementary metal oxide semiconductor ("CMOS") technology, can switch signals in less than 1 nanosecond. On a long bus, this fast edge rate can generate substantial ringing and overshoot due to transmission line effects. As mentioned previously, there are general guidelines for minimizing undesired transmission line effects, but a design engineer needs a means for evaluating these effects, both qualitatively and quantitatively, under a variety of representative loads.

It has therefore become very important to test new, open architecture computer designs to ensure, as well as can be done, that the buses are relatively insusceptible to changes in electrical characteristics due to addition of peripheral cards to the computer. In the past, this was done by inserting cards notoriously known to have the most ill effect on computer buses into a prototype computer system and placing logic probes on the various bus conductors to determine what effect, if any, the cards' presence has. Unfortunately, the list of notorious cards may be incomplete; new, even more injurious cards may appear on the market; the notorious cards may not be available, even if they are known and detrimental interaction between the cards may not be able to be determined.

Furthermore, it is inefficient to insert and remove many different cards and time consuming to configure the cards appropriately to generate proper signals. Once configured it is difficult to observe (with a logic probe or analyzer) a signal of interest because there are many signals switching at once. It may be difficult to generate a particular cycle type, and once the cycle occurs, it can be difficult to trigger the test equipment (usually a high speed oscilloscope) to capture the event.

Thus, what is needed in the art is a more efficient and effective apparatus and method for testing transmission line effects on conductors (and more specifically, personal computer buses). The apparatus and method should be extremely flexible so as to encompass as many different combinations and permutations of peripheral cards as possible and should allow signals to be tested in relative isolation.

SUMMARY OF THE INVENTION

Accordingly, to address the above-discussed deficiencies of the prior art, it is a primary object of the present invention to provide an apparatus for testing transmission line effects on personal computer buses to ensure that they are not overly susceptible to variations in peripheral card configuration. Thus, the present invention is directed to a dedicated apparatus for simulating the electrical effect of real-world peripheral cards on a computer bus. The apparatus should be as flexible as possible, allowing the testing of a wide variety of possible conditions on each of the lines in the buses.

In the attainment of the above-noted primary object, the present invention provides an apparatus comprising: (1) a plurality of transmission line segments having different physical dimensions, each of the plurality of segments having a different electrical effect on signals transmitted thereon and (2) a switching circuit capable of coupling successive ones of the plurality of segments to an external conductor, an electrical characteristic of the external conductor affected by the coupling of the successive ones of the plurality of segments thereto, the apparatus permitting signals to pass through the external conductor and a selected one of the plurality of segments via the switching circuit. The apparatus therefore allows a determination of a susceptibility of the external conductor to changes in transmission line electrical characteristics brought about by various possible combinations of peripheral expansion bus cards. The advantage of the present invention is that it is no longer necessary to install a variety of cards in a computer to verify bus design and to laboriously configure each card. Instead, one card can be quickly configured to simulate the various cards, even to the point of producing bus interference beyond that produced by most normally-functioning peripheral cards. The apparatus of the present invention can further produce signals of a desired type at a desired time and in isolation to allow more effective diagnosis of transmission line effects.

In addition to transmission line segments of various lengths and widths, the present invention provides, in a preferred embodiment, at least one model electrical load capable of being coupled to a selected one of the plurality of segments, the load further affecting the electrical characteristics of the external conductor when coupled thereto. The load may comprise a resistor, a diode or a capacitor. It is merely optional to couple the load to a segment for testing; the segment alone has capacitance and self-inductance. However, addition of the load introduces different overall electrical characteristics to the external conductor, allowing even more complete testing to occur.

In a preferred embodiment, the external conductor is one of a plurality of conductors external to the apparatus. The switching circuit preferably comprises a circuit capable of coupling a selected one of the plurality of segments to a selected one of a plurality of external conductors, the plurality of external conductors employed as lines in a computer bus. A second switching circuit is capable of coupling a selected one of a plurality of model electrical loads to a selected one of the plurality of segments, the plurality of loads simulating loads potentially present within the computer.

In the embodiment to be disclosed, the switching circuit comprises a plurality of jumpers between the plurality of segments and the external conductor, one of the plurality of jumpers coupling a corresponding one of the plurality of segments to the external conductor when a shorting block is placed in one of the plurality of jumpers. However, those ordinarily skilled in the art will readily understand that there are alternatives to jumpers. Relays and solid state switches allow remote setting of the various possible combinations of segments and loads in the apparatus. Setting can also be under software control of either a dedicated apparatus-controlling computer or the computer under test.

In a preferred embodiment, the present invention comprises an arbitrator and driver circuit capable of allowing the apparatus to place signals on the external conductor (a part of the computer bus). This allows the apparatus to be bus master of the computer and to place signals on the computer bus. This allows for more thorough testing of the computer bus in a manner to be described more fully.

Finally, the present invention is preferably embodied on a peripheral card adapted to be placed in an expansion slot of a personal computer. This allows the apparatus access to each expansion bus line and allows the apparatus to simulate any one of a great number of possible combinations and permutations of other expansion bus cards potentially coupled to the electrical bus during operation of the PC.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
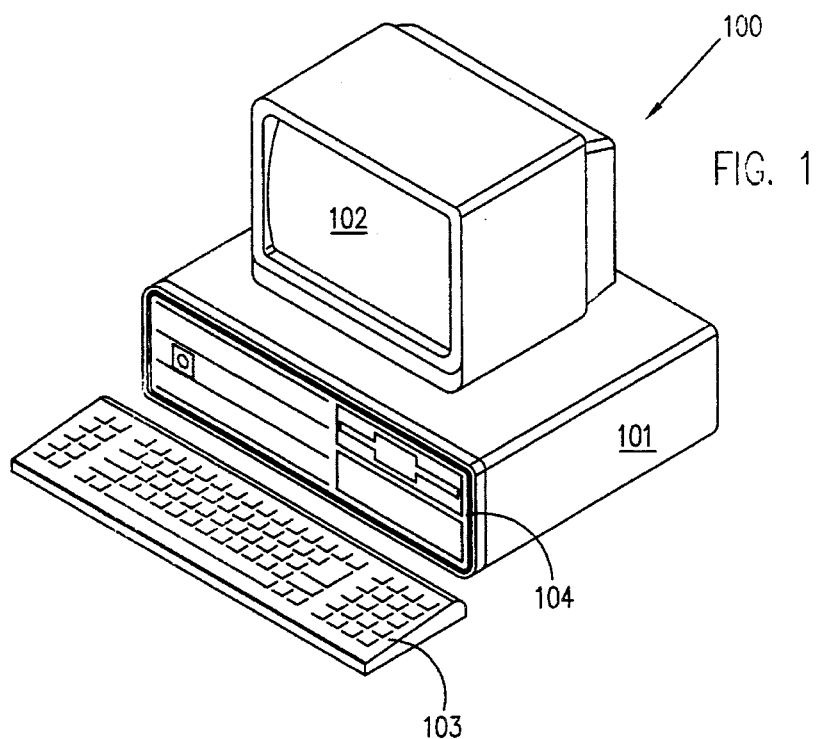
FIG. 1 illustrates an isometric view of a prototype, open-architecture personal computer to be tested for bus transmission line characteristics.

Referring initially to FIG. 1, illustrated is an isometric view of a prototype, open-architecture personal computer ("PC") to be tested for bus transmission line characteristics. The PC, generally designated 100, comprises a main chassis 101 containing the PC's central processing unit ("CPU") and other electrical and electronic components. A monitor 102 allows the PC 100 to display data to a user, while a keyboard 103 allows the user to enter data into the PC 100. A disk drive 104 provides relatively nonvolatile storage for data.

Figure 2:
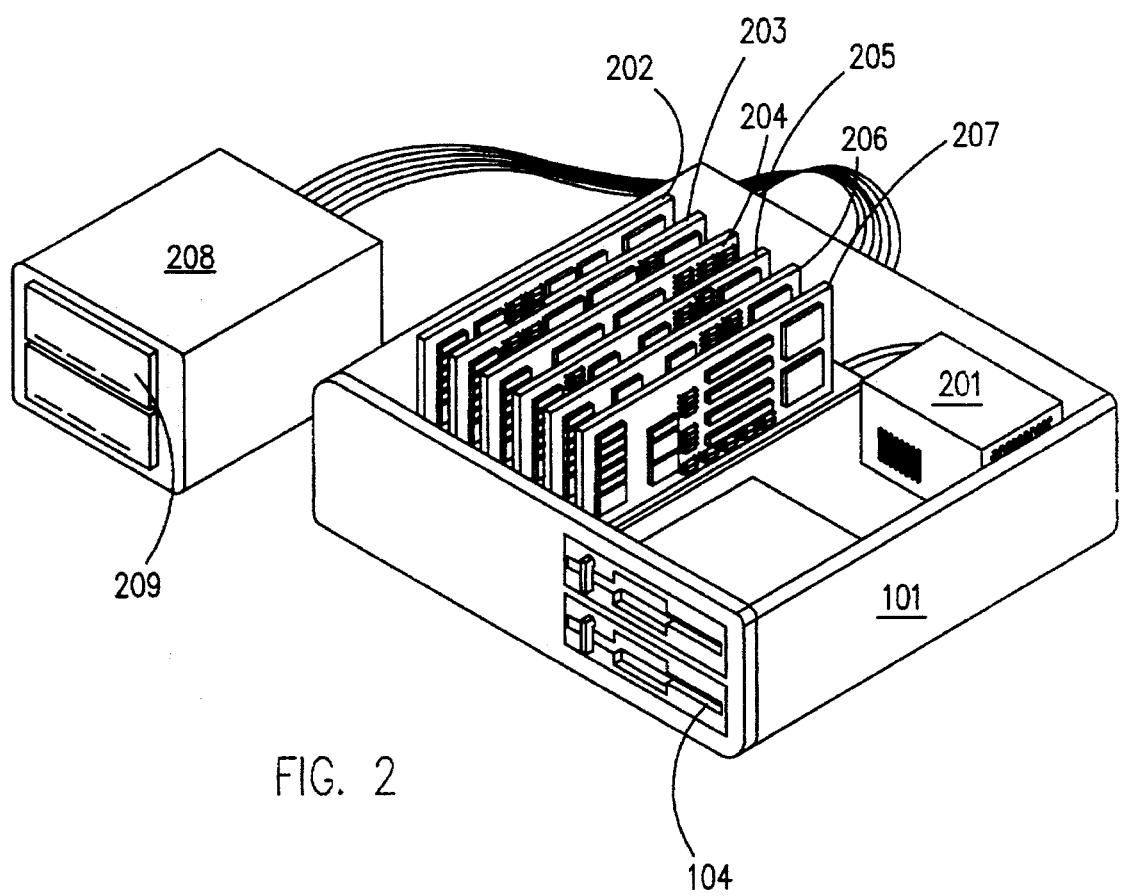
FIG. 2 illustrates an isometric view of an open chassis of the personal computer of FIG. 1, showing, in particular, peripheral cards therein.

Turning now to FIG. 2, illustrated is an isometric view of an open chassis of the PC 100 of FIG. 1, showing, in particular, peripheral (or "expansion") cards therein. The PC 100 is an open-architecture computer. "Open architecture," for purposes of the present invention, is defined as an architecture that allows for a relatively great variety of original equipment manufacturer peripherals to be added thereto. The architecture is characterized by one or more electrical connectors (or "slots") allowing daughterboards containing the peripherals to be electrically coupled to the CPU via one or more industry-standard expansion buses.

In so-called IBM-compatible PCs, such open-architectures feature buses that adhere to one of several accepted standards, such as the Industry Standard Architecture ("ISA"), the Expanded Industry Standard Architecture ("EISA"), the Micro-Channel Architecture ("MCA"), Video Electronics Standards Association Local Bus ("VL-BUS") and Peripheral Component Interconnect ("PCI").

Again with reference to FIG. 2, shown is a power supply 201 that provides power to components within the PC 100, including the disk drive 104. A plurality of peripheral cards 202, 203, 204, 205, 206, 207 are shown as installed in six available peripheral card slots within the chassis 101. These peripheral cards may include a modem; facsimile; a disk drive controller; a video controller; a serial, parallel or small computer systems interface ("SCSI") port; auxiliary memory; a coprocessor; a sound board; a network board and the like. For purposes of the present invention, it does not matter which boards a PC may have installed. Further, it does not matter into which slot a board is installed. Each of the slots is electrically identical. It suffices to say that there are many ways to configure an open-architecture PC via the expansion slots.

As mentioned previously, since these cards are coupled to each of the computer's expansion buses, the installation of a card to a system is likely to have an effect on the electrical characteristics (capacitance, resistance and inductance) of each of the conductors in the buses due to the existence or operation of circuitry on the cards. The cards may also electrically interact with each other in a perhaps nonobvious way to further compromise bus performance. Therefore, the present invention is designed to plug into any one of the PC's expansion slots to simulate one or more actual cards.

Also shown in FIG. 2 is an auxiliary chassis 208 containing, for instance, a disk drive 209. The auxiliary chassis 208 is shown to illustrate that peripherals physically outside the main chassis 101 may nonetheless be coupled to the CPU via an expansion slot. Most typically, external disk drives, such as the disk drive 209, are coupled via a SCSI controller card, which may be one of the cards 202, 203, 204, 205, 206, 207.

Figure 3:
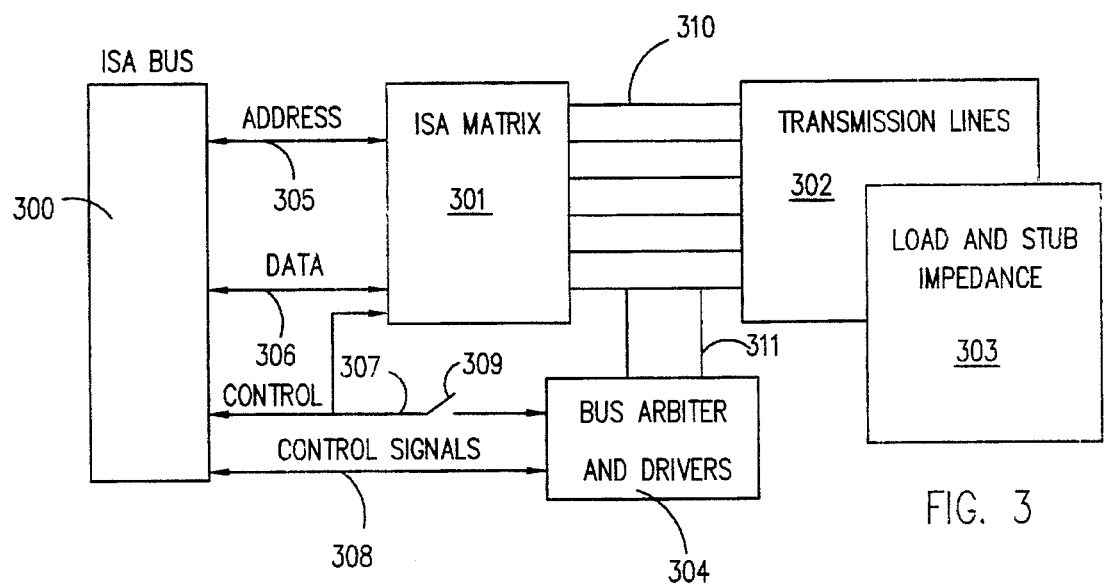
FIG. 3 illustrates a block diagram of the apparatus for testing computer bus characteristics of the present invention.

Turning now to FIG. 3, illustrated is a block diagram of the apparatus for testing computer bus characteristics of the present invention. The present invention aids engineers and technicians in evaluating the high speed electrical behavior of PCs. The present invention is preferably embodied on a peripheral card that installs into the expansion bus of the PC and can be configured to place representative loads on critical control signals. The loads consist of varying lengths of a variety of configurations of transmission lines and terminating and stub impedances. Test points on the card allow the signal quality to be evaluated at points along the transmission lines. The present invention includes logic to generate bus master cycles and drivers to inject signals onto the bus, allowing evaluation of transmitted signal integrity as well as received signal quality. As such, the present invention is the first designed to represent the transmission line loading of expansion cards and aid the efficient and effective design, verification and validation of PCs.

An expansion bus within the PC 100 of FIGS. 1 and 2 is represented in block form as an ISA bus 300. The ISA bus 300 comprises address 305, data 306 and control 307 buses, each of which buses comprises a plurality of lines, each of which lines is a separate electrical conductor. As mentioned previously, electrical conductors are subject to transmission line effects that become pronounced when high frequency signals are transmitted along the conductors. As PCs become faster, the frequency of these signals has become sufficiently high to render the conductors susceptible to interference from peripheral cards absent good initial design and layout.

An ISA matrix (or "switch circuit") 301 is coupled directly to each of the lines in the buses 305, 306, 307. A bus arbiter and driver circuit 304 is swichably coupled to the control bus 307 via a switch 309. The bus arbiter and driver circuit 304 is further coupled via a line 308 to allow generation of "request," "acknowledge" and "busmaster" signals, allowing the bus arbiter and driver circuit to become busmaster of the PC 100. The ISA matrix 301 is also coupled to a plurality of transmission line segments 302 via lines 310. Appropriately titled, the ISA matrix 301 comprises a plurality of make-or-break contacts allowing any selected one of the conductors making up the ISA bus 300 to be coupled to any selected one or more of the transmission line segments 302. Thus, the ISA matrix may be thought of as a two-dimensional array of switches.

In the illustrated embodiment of the present invention, the ISA matrix 301 comprises a plurality of jumpers (illustrated more completely in FIG. 5) between the plurality of segments 302 and each of the external conductors, one or more of the plurality of jumpers coupling a corresponding one or more of the plurality of segments to the external conductor when one or more shorting blocks are placed in the plurality of jumpers. However, those ordinarily skilled in the art will readily understand that there are alternatives to jumpers. Relays and solid state switches allow remote setting of the various possible combinations of segments and loads in the apparatus. Setting can also be under software control of the computer under test. In fact, it may in some applications be desirable to provide a dedicated computer tethered to the apparatus. When the apparatus is installed in an expansion slot of a computer to be tested ("computer under test") and test software within the dedicated computer is activated, the dedicated computer may itself set electronic switches within the ISA matrix 301 and generate and monitor bus signals, allowing rapid reconfiguration of the apparatus and all-night, all-inclusive testing of the computer under test.

The transmission line segments 302 are conductors, most desirably traces on a printed circuit board, of certain physical dimensions, more specifically, length, width and distance from a ground plane. In fact, a preferred embodiment of the present invention provides for transmission line sections having the following dimensions and characteristics:

a) 7 mil width, 3", 9" and 18" over ground;

b) 12 mil width, 3", 9" and 18" over ground; and c) 7 mil width, 3", 9" and 18", 12 mil ground at 13 mil spacing.

The transmission line segments can be interconnected as desired to produce a transmission line of varying lengths.

Also shown in FIG. 3 are a plurality of load and stub impedances ("model electrical loads") 303 that are optionally couplable to selected ones of the transmission line segments 302. Furthermore, the load and stub impedances 303 can be coupled to selected ones of the transmission line segments 302. This allows the transmission line segments 302 to simulate electronic circuitry or loads present when various expansion cards are coupled to the PC 100 and not merely the conductors or traces thereon, giving the apparatus more flexibility.

The bus arbiter and driver circuit 304 comprises a circuitry allowing the apparatus to act as bus master to drive the computer under test, the drivers placing test signals on the various buses therein, allowing further testing. Those skilled in the art are familiar with arbiter, driver and bus master circuits and their operation. With respect to the present invention, the arbiter and driver circuit 304 communicates with the control bus 307 via the closed switch 309 when the circuit 304 is in control of the ISA bus 300. Finally, lines 311 allow the arbiter and driver circuit 304 to inject signals onto the transmission lines 302 to simulate signals generated from an peripheral card to the ISA bus 300.

Figure 4:
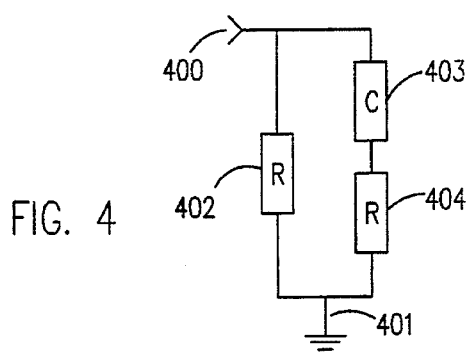
FIG. 4 illustrates a block diagram of a model electrical load employed within the apparatus of FIG. 3.

Turning now to FIG. 4, illustrated is a block diagram of a model electrical load employed within the apparatus of FIG. 3. The load comprises an input 400 couplable to one or more of the transmission line segments 302, a first resistor 402 in electrical parallel with a series-coupled capacitor 403 and second resistor 404. A ground connection 401 completes the circuit, resulting in a load. Depending upon the values of the first and second resistors 402, 404 and the capacitor 403, a wide variety of load characteristics and resonant frequencies can be simulated. Those skilled in the art will understand that the model load represented in FIG. 4 is conventional and flexible and that other conventional, equally flexible model loads are possible and desirable to place within the collection of selectable load and stub impedances 303.

Figure 5:
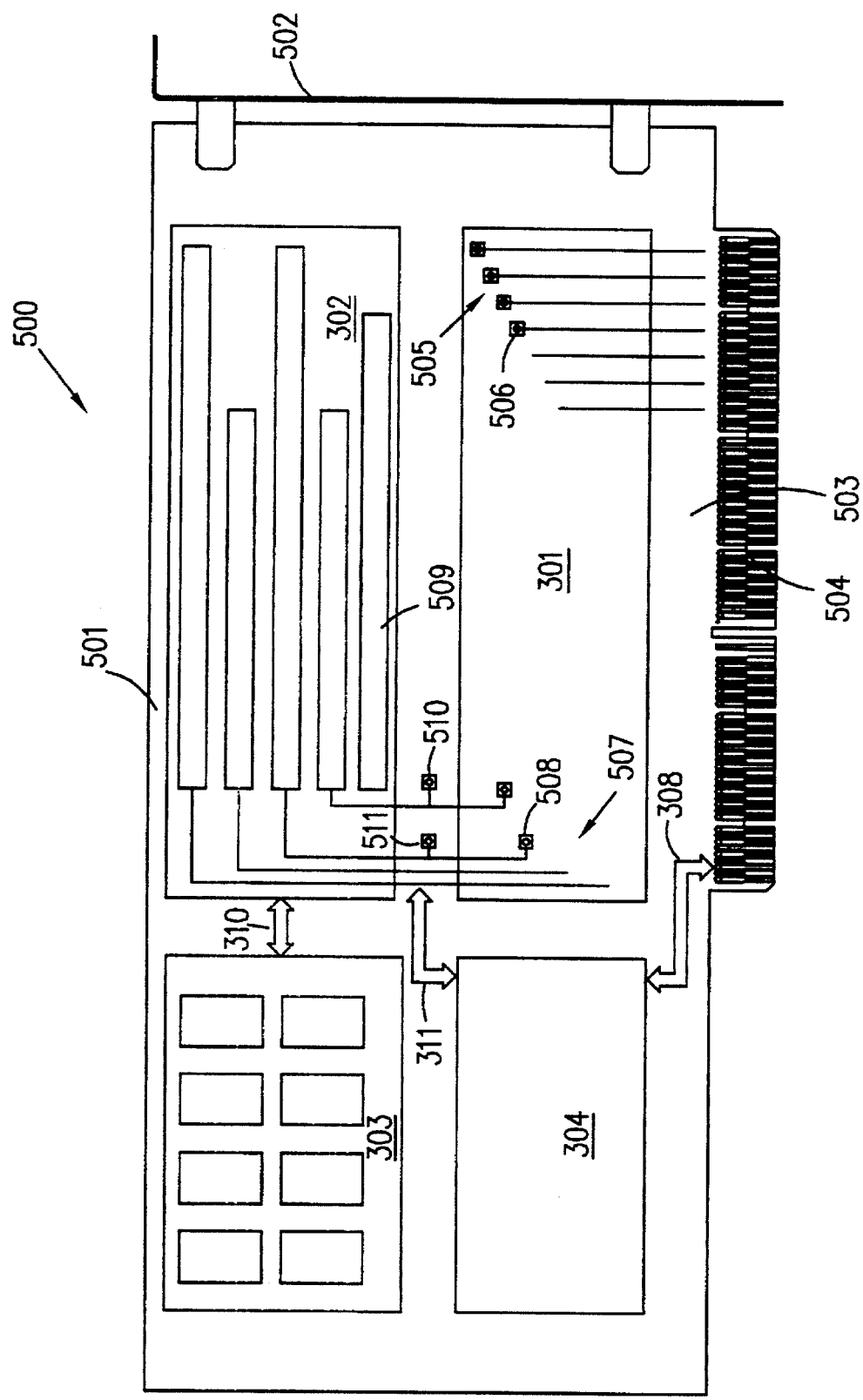
FIG. 5 illustrates a plan view of a peripheral card containing the apparatus of FIG. 3.

Turning now to FIG. 5, illustrated is a representational plan view of an peripheral card containing the apparatus of FIG. 3. It should be stressed that FIG. 5 is a high-level diagram and is not intended to represent an actual board layout of either circuitry or traces therebetween. Those skilled in the art can, using the above disclosure, replicate the present invention. FIG. 5 shows a peripheral card 500 shaped to be received into a standard, IBM-compatible expansion slot. The card 500 comprises a planar printed circuit board 501 having a bracket 502 attached thereto. The bracket 502 engages a portion of the main chassis 101 of FIG. 1 to hold the card 500 in place. A card edge 503 of the card 500 has a plurality of contacts 504 thereon. The contacts 504 engage with resilient contacts within a connector (not shown) when the card 500 is inserted into a slot. The contacts 504 provide electrical access to the various buses of the PC 100 of FIG. 1 for the apparatus of the present invention.

The ISA matrix 301 contains traces from the card edge 503 and the transmission line segments 302. These are represented by lines 505 and 507, respectively. The lines 505, 507 terminate in jumper posts 506, 508, respectively. The jumper posts 506, 508 are entirely conventional and are adapted to receive shorting blocks (not shown), allowing any two jumper posts to be shorted together. It should be noted that FIG. 5 does not show the various jumper posts 506, 508 to be in proximity to one another as conventional placement requires. Again, FIG. 5 is merely representational. By placing shorting blocks as required, any one or more transmission line segments 302 can be coupled to any line 505.

The transmission line segments 302 are represented as traces of varying length, width and distance from ground (represented as strip 509). The load and stub impedances 303 are represented as separate blocks, as they are individually couplable to the transmission line segments 302. Again, the arbiter and driver circuit 304 can communicate with the ISA bus (not shown in FIG. 5) via lines 308 to establish the apparatus as bus master or can inject signals into the transmission line segments 302 by way of the lines 311. Finally, test points, represented by points 510, 511 allow a separate test apparatus, such as a logic probe or analyzer, to be coupled thereto, the logic probe or analyzer receiving and displaying signals at a selected one of the test points 510, 511 to a technician for diagnostic purposes.

From the above, it is apparent that the present invention provides, among other things, an apparatus for testing transmission line effects comprising: (1) a plurality of transmission line segments having different physical dimensions, each of the plurality of segments having a different electrical effect on signals transmitted thereon and (2) a switching circuit capable of coupling successive ones of the plurality of segments to an external conductor, an electrical characteristic of the external conductor affected by the coupling of the successive ones of the plurality of segments thereto, the apparatus permitting signals to pass through the external conductor and a selected one of the plurality of segments via the switching circuit, thereby allowing a determination of a susceptibility of the external conductor to changes in transmission line electrical characteristics brought about by various possible combinations of peripheral expansion bus cards.

Although the present invention and its advantages have been described in detail, it should be understood that various changes, substitutions and alterations can be made herein without departing from the spirit and scope of the invention as defined by the appended claims.

What is claimed is:

1. An apparatus for inspecting transmission line effects, comprising:

a plurality of transmission line segments having different physical dimensions, each of said plurality of transmission line segments having a different electrical effect on signals transmitted thereon; and a switching circuit coupling successive ones of said plurality of transmission line segments to an external conductor, an electrical characteristic of said external conductor affected by said coupling of said successive ones of said plurality of transmission line segments thereto, said apparatus permitting signals to pass through said external conductor and a selected one of said plurality of transmission line segments via said switching circuit to allow a determination of a susceptibility of said external conductor to changes in transmission line electrical characteristics.

2. The apparatus as recited in claim 1 further comprising a model electrical load coupled to a selected one of said plurality of transmission segments, said load further affecting said electrical characteristic of said external conductor when coupled thereto.

3. The apparatus as recited in claim 1 wherein said physical dimensions are length and width.

4. The apparatus as recited in claim 1 wherein said external conductor is a line in a computer bus.

5. The apparatus as recited in claim 1 wherein said switching circuit comprises a circuit coupling a selected one of said plurality of transmission line segments to a selected one of a plurality of external conductors, said plurality of external conductors employed as lines in a computer bus.

6. The apparatus as recited in claim 1 further comprising a second switching circuit coupling a selected one of a plurality of model electrical loads to a selected one of said plurality of transmission line segments, said plurality of model electrical loads simulating loads potentially present within a computer.

7. The apparatus as recited in claim 1 wherein said switching circuit comprises a plurality of jumpers between said plurality of transmission segments and said external conductor, one of said plurality of jumpers coupling a corresponding one of said plurality of transmission line segments to said external conductor when a shorting block is placed in said one of said plurality of jumpers.

8. The apparatus as recited in claim 1 further comprising a circuit allowing said apparatus to place signals on said external conductor.

9. The apparatus as recited in claim 1 further comprising a circuit allowing said apparatus to be bus master of a computer, said apparatus placing signals on a computer bus within said computer, said external conductor being one of a number of lines in said computer bus.

10. The apparatus as recited in claim 1 wherein said apparatus is located on a peripheral card suitable for placement in an expansion slot of a personal computer.

11. A method of inspecting transmission line effects, comprising the steps of:
   providing a plurality of transmission line segments having different physical dimensions, each of said plurality of transmission line segments having a different electrical effect on signals transmitted thereon;
   coupling successive ones of said plurality of transmission line segments to an external conductor with a switching circuit, an electrical characteristic of said external conductor affected by said coupling of said successive ones of said plurality of transmission line segments thereto; and
   passing signals through said external conductor and a selected one of said plurality of transmission line segments via said switching circuit to allow a determination of a susceptibility of said external conductor to changes in transmission line electrical characteristics.

12. The method as recited in claim 11 further comprising the step of coupling a model electrical load to a selected one of said plurality of transmission line segments, said load further affecting said electrical characteristic of said external conductor when coupled thereto.

13. The method as recited in claim 11 wherein said physical dimensions are length and width.

14. The method as recited in claim 11 wherein said external conductor is a line in a computer bus.

15. The method as recited in claim 11 further comprising the step of coupling a selected one of said plurality of transmission line segments to a selected one of a plurality of external conductors, said plurality of external conductors employed as lines in a computer bus.

16. The method as recited in claim 11 further comprising the step of coupling a selected one of a plurality of model electrical loads to a selected one of said plurality of transmission line segments, said plurality of model electrical loads simulating loads potentially present within a computer.

17. The method as recited in claim 11 wherein said switching circuit comprises a plurality of jumpers between said plurality of transmission line segments and said external conductor, said method further comprising the step of coupling, with one of said plurality of jumpers, a corresponding one of said plurality of transmission line segments to said external conductor by placing a shorting block in said one of said plurality of jumpers.

18. The method as recited in claim 11 further comprising the step of placing signals on said external conductor.

19. The method as recited in claim 11 further comprising the step of activating an arbiter and driver circuit placing signals on a computer bus within said computer, said external conductor being one of a number of lines in said computer bus.

20. The method as recited in claim 11 wherein said plurality of transmission line segments and said switching circuit are located on a peripheral card suitable for placement in an expansion slot of a personal computer.

21. An apparatus for inspecting transmission line effects on a computer bus, comprising:
   an expansion bus card adapted to engage with an electrical bus in a personal computer (PC) expansion slot via a card edge;
   a plurality of transmission line segments having different widths and lengths positioned on said expansion bus card, each of said plurality of transmission line segments having a different electrical effect on signals transmitted thereon, said plurality of transmission line segments simulating other expansion bus cards potentially coupled to said electrical bus during operation of said PC;
   a plurality of model electrical loads having different electrical characteristics positioned on said expansion bus card, each of said plurality of model electrical loads having a different electrical effect on signals transmitted therethrough, said plurality of model electrical loads simulating loads potentially coupled to said electrical bus via said other expansion bus cards;
   a switching circuit positioned on said expansion bus card coupling a selected one of said plurality of transmission line segments to a selected conductor of said electrical bus via a corresponding contact on said card edge, said switching circuit further coupling a selected one of said plurality of model electrical loads to said selected one of said plurality of transmission line segments, an electrical characteristic of said selected conductor affected thereby, said apparatus permitting signals on said selected conductor to pass through said selected one of said plurality of transmission line segments via said card edge conductor and said switching circuit to allow a determination of a susceptibility of said electrical bus to changes in transmission line electrical characteristics; and
   an arbiter and driver circuit allowing said apparatus optionally to generate signals on said PC electrical bus for transmission into said selected transmission line.-;

22. The apparatus as recited in claim 21 wherein said switching circuit comprises a plurality of jumpers between said plurality of transmission line segments and contacts on said card edge, one of said plurality of jumpers coupling a corresponding one of said plurality of transmission line segments to said external conductor when a shorting block is placed in said one of said plurality of jumpers.

23. The apparatus as recited in claim 21 wherein said switching circuit comprises a second plurality of jumpers between said plurality of model electrical loads and said plurality of transmission line segments, one of said second plurality of jumpers coupling one of said plurality of model electrical loads to one of said plurality of transmission line segments when a shorting block is placed in said one of said plurality of jumpers.

24. The apparatus as recited in claim 21 wherein said plurality of transmission line segments are electrical traces on said expansion bus card.

25. The apparatus as recited in claim 21 wherein said plurality of model electrical loads are comprised of components selected from the group consisting of:

resistors, diodes and capacitors.

26. The apparatus as recited in claim 21 wherein said electrical bus comprises address, data and control buses.

27. The apparatus as recited in claim 21 further comprising a circuit coupling a portion of said electrical bus to said arbiter and driver circuit to allow said arbiter and driver circuit to generate signals on said portion of said electrical bus.

28. The apparatus as recited in claim 21 wherein said electrical bus conforms to a standard architecture selected from the group consisting of:

Industry Standard Architecture (ISA),

Expanded Industry Standard Architecture (EISA) and

Micro-Channel Architecture (MCA).

29. The apparatus as recited in claim 21 wherein said switching circuit comprises a plurality of switches selected from the group consisting of:

jumpers, relays and electronic switches.

30. The apparatus as recited in claim 21 further comprising a plurality of test points located on said expansion bus card.

31. A method of inspecting transmission line effects, comprising the steps of:

installing an expansion bus card into a personal computer (PC) expansion slot, a card edge on said expansion bus card coupling with an electrical bus in said PC;

selecting one of a plurality of transmission line segments having different widths and lengths positioned on said expansion bus card, each of said plurality of transmission line segments having a different electrical effect on signals transmitted thereon, said plurality of transmission line segments simulating other expansion bus cards potentially coupled to said electrical bus during operation of said PC;

optionally selecting one of a plurality of model electrical loads having different electrical characteristics positioned on said expansion bus card, each of said plurality of model electrical loads having a different electrical effect on signals transmitted therethrough, said plurality of model electrical loads simulating loads potentially coupled to said electrical bus via said other expansion bus cards;

configuring a switching circuit positioned on said expansion bus card to electrically couple said selected segment to a selected conductor of said electrical bus via a corresponding contact on said card edge;

optionally configuring said switching circuit to electrically couple said optionally selected load to said selected one of said plurality of transmission line segments, an electrical characteristic of said selected conductor affected thereby permitting signals on said selected conductor to pass through said selected one of said plurality of transmission line segments via said card edge conductor and said switching circuit to allow a determination of a susceptibility of said electrical bus to changes in transmission line electrical characteristics; and optionally allowing an arbiter and driver circuit to generate signals on said PC electrical bus for transmission into said selected transmission line.

32. The method as recited in claim 31 wherein said switching circuit comprises a plurality of jumpers between said plurality of transmission line segments and contacts on said card edge, one of said plurality of jumpers coupling a corresponding one of said plurality of transmission line segments to said external conductor when a shorting block is placed in said one of said plurality of jumpers.

33. The method as recited in claim 31 wherein said switching circuit comprises a second plurality of jumpers between said plurality of model electrical loads and said plurality of transmission line segments, one of said second plurality of jumpers coupling one of said plurality of model electrical loads to one of said plurality of transmission line segments when a shorting block is placed in said one of said plurality of jumpers.

34. The method as recited in claim 31 wherein said plurality of transmission line segments are electrical traces on said expansion bus card.

35. The method as recited in claim 31 wherein said plurality of model electrical loads are comprised of components selected from the group consisting of:

resistors, diodes and capacitors.

36. The method as recited in claim 31 wherein said electrical bus comprises address, data and control buses.

37. The method as recited in claim 31 further comprising the step of coupling a portion of said electrical bus to said arbiter and driver circuit to allow said arbiter and driver circuit to generate signals on said portion of said electrical bus.

38. The method as recited in claim 31 wherein said electrical bus conforms to a standard architecture selected from the group consisting of:

Industry Standard Architecture (ISA),

Expanded Industry Standard Architecture (EISA) and

Micro-Channel Architecture (MCA).

39. The method as recited in claim 31 wherein said switching circuit comprises a plurality of switches selected from the group consisting of:

jumpers, relays and electronic switches.

40. The method as recited in claim 31 further comprising the step of deriving said signals from a selected one of a plurality of test points located on said expansion bus card.

* * * * *